(12) United States Patent
Romanovsky et al.

(10) Patent No.: US 9,928,169 B2
(45) Date of Patent: Mar. 27, 2018

(54) METHOD AND SYSTEM FOR IMPROVING SWAP PERFORMANCE

(71) Applicant: SanDisk Technologies Inc., Plano, TX (US)

(72) Inventors: Leon Romanovsky, Haifa (IL); Alon Marcu, Tel Mond (IL)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/272,238

(22) Filed: May 7, 2014

(65) Prior Publication Data
US 2015/0324119 A1     Nov. 12, 2015

(51) Int. Cl.
*G06F 12/00*     (2006.01)
*G06F 13/00*     (2006.01)
(Continued)

(52) U.S. Cl.
CPC .............. *G06F 12/08* (2013.01); *G06F 3/061* (2013.01); *G06F 3/065* (2013.01); *G06F 3/0659* (2013.01);
(Continued)

(58) Field of Classification Search
CPC . G06F 3/06; G06F 3/061; G06F 3/065; G06F 3/0659; G06F 3/0679; G06F 12/0253; G06F 12/08; G06F 12/0246; G06F 12/0868; G06F 12/0238; G06F 2212/2022; G06F 2212/214; G06F 2212/72; G06F 2212/7201; G06F 2212/7202;
(Continued)

(56) References Cited

U.S. PATENT DOCUMENTS 6,581,133 B1    6/2003   Bitner et al.
6,933,919 B1    8/2005   Anderson et al.
(Continued)

FOREIGN PATENT DOCUMENTS

DE     10 2004 055051 B3    10/2005

OTHER PUBLICATIONS

Arya, P., "A Survey of 3D Nand Flash Memory", *EECS Int'l Graduate Program, National Chiao Tung University*, 2012, pp. 1-11.
(Continued)

*Primary Examiner* — Sean D Rossiter
(74) *Attorney, Agent, or Firm* — Brinks Gilson & Lione

(57) ABSTRACT

A method and system for improving swap performance are provided. In one embodiment, a computing device is provided with a volatile memory and a non-volatile memory, wherein the non-volatile memory has a first swap area with multi-level cell (MLC) memory and a second swap area with single-level cell (SLC) memory. One of the characteristics of SLC memory is that data is written more quickly in the SLC memory than the MLC memory. A determination is made whether the computing device is operating in normal mode or burst mode. If it is determined that the computing device is operating in normal mode, data is moved from the volatile memory to the first swap area during a swap operation. If it is determined that the computing device is operating in burst mode, data is moved from the volatile memory to the second swap area during a swap operation.

33 Claims, 9 Drawing Sheets

(51) Int. Cl.
*G06F 12/08* (2016.01)
*G06F 3/06* (2006.01)
*G06F 12/02* (2006.01)

(52) U.S. Cl.
CPC ........ *G06F 3/0679* (2013.01); *G06F 12/0253* (2013.01); *G06F 12/0246* (2013.01); *G06F 2206/1014* (2013.01); *G06F 2212/1016* (2013.01); *G06F 2212/1044* (2013.01); *G06F 2212/7201* (2013.01); *G06F 2212/7202* (2013.01); *G06F 2212/7203* (2013.01); *G06F 2212/7205* (2013.01); *Y02B 60/1225* (2013.01)

(58) Field of Classification Search
CPC ..... G06F 2212/7203; G06F 2212/7206; G06F 2212/7208; G06F 3/0685; G06F 3/0688
USPC .......................................................... 711/103
See application file for complete search history.

(56) References Cited

U.S. PATENT DOCUMENTS

| | | | |
|---|---|---|---|
| 7,003,621 B2 | 2/2006 | Koren | |
| 7,035,964 B1 | 4/2006 | Kohler et al. | |
| 7,110,301 B2 | 9/2006 | Lee | |
| 7,315,916 B2 | 1/2008 | Bennett | |
| 7,433,951 B1 | 10/2008 | Waldspurger | |
| 7,826,469 B1 | 11/2010 | Li et al. | |
| 7,831,783 B2 | 11/2010 | Pandit et al. | |
| 7,948,798 B1* | 5/2011 | Sheredy | G11C 11/5628 365/185.03 |
| 8,099,568 B2 | 1/2012 | Colbert et al. | |
| 8,112,755 B2 | 2/2012 | Apacible et al. | |
| 8,130,554 B1 | 3/2012 | Linnell | |
| 8,135,931 B2* | 3/2012 | Yamauchi | G06F 21/45 711/163 |
| 8,187,936 B2 | 5/2012 | Alsmeier et al. | |
| 8,261,009 B2* | 9/2012 | Freikorn | G06F 12/0246 711/103 |
| 8,554,986 B2 | 10/2013 | Lee | |
| 8,694,754 B2* | 4/2014 | Schuette | G06F 3/0616 711/103 |
| 8,738,840 B2 | 5/2014 | Tzeng | |
| 8,819,337 B1* | 8/2014 | Oshinsky | G06F 11/14 365/185.07 |
| 8,898,374 B2* | 11/2014 | Yang | G06F 12/0246 365/185.01 |
| 8,909,888 B2 | 12/2014 | Goss et al. | |
| 8,972,675 B2* | 3/2015 | Avila | G06F 12/0246 711/111 |
| 9,053,019 B2 | 6/2015 | Roh | |
| 2002/0134222 A1 | 9/2002 | Tamura | |
| 2004/0030882 A1 | 2/2004 | Forman | |
| 2004/0068627 A1 | 4/2004 | Sechrest et al. | |
| 2005/0256997 A1 | 11/2005 | Koren et al. | |
| 2006/0083069 A1* | 4/2006 | Fasoli | G11C 5/04 365/185.19 |
| 2006/0123320 A1 | 6/2006 | Vogt | |
| 2007/0005883 A1 | 1/2007 | Trika | |
| 2007/0016725 A1* | 1/2007 | Chu | G06F 3/0616 711/113 |
| 2007/0055813 A1 | 3/2007 | Ingram et al. | |
| 2007/0168632 A1 | 7/2007 | Zeevi | |
| 2007/0226443 A1 | 9/2007 | Giampaolo | |
| 2008/0059785 A1 | 3/2008 | O'Connell | |
| 2008/0074931 A1 | 3/2008 | Kim | |
| 2008/0126680 A1* | 5/2008 | Lee | G06F 3/0613 711/103 |
| 2009/0083478 A1* | 3/2009 | Kunimatsu | G06F 12/0246 711/103 |
| 2009/0113444 A1 | 4/2009 | Hackborn | |
| 2009/0119450 A1 | 5/2009 | Saeki et al. | |
| 2009/0172255 A1* | 7/2009 | Yeh | G06F 12/0246 711/103 |
| 2009/0198874 A1 | 8/2009 | Tzeng | |
| 2009/0222639 A1 | 9/2009 | Hyvonen et al. | |
| 2009/0240873 A1* | 9/2009 | Yu | G06F 3/0608 711/103 |
| 2009/0291696 A1 | 11/2009 | Cortes et al. | |
| 2009/0327591 A1* | 12/2009 | Moshayedi | G06F 11/1441 711/103 |
| 2010/0023565 A1 | 1/2010 | Colbert et al. | |
| 2010/0042773 A1* | 2/2010 | Yeh | G06F 12/0804 711/103 |
| 2010/0064111 A1* | 3/2010 | Kunimatsu | G06F 12/08 711/161 |
| 2010/0075760 A1 | 3/2010 | Shimabukuro et al. | |
| 2010/0118434 A1 | 5/2010 | Inoue | |
| 2010/0169540 A1* | 7/2010 | Sinclair | G06F 12/0246 711/103 |
| 2010/0191874 A1 | 7/2010 | Feeley et al. | |
| 2010/0274955 A1* | 10/2010 | Lasser | G06F 12/0246 711/103 |
| 2011/0010722 A1 | 1/2011 | Matsuyama | |
| 2011/0066792 A1 | 3/2011 | Shaeffer et al. | |
| 2011/0145490 A1 | 6/2011 | Lee et al. | |
| 2011/0213954 A1 | 9/2011 | Baik | |
| 2011/0302224 A1 | 12/2011 | Yairi et al. | |
| 2012/0054465 A1 | 3/2012 | Post et al. | |
| 2012/0079167 A1* | 3/2012 | Yao | G06F 12/0246 711/103 |
| 2012/0167100 A1* | 6/2012 | Li | G11C 16/26 718/102 |
| 2012/0198174 A1* | 8/2012 | Nellans | G06F 12/0804 711/133 |
| 2012/0254520 A1 | 10/2012 | Roh | |
| 2012/0254966 A1 | 10/2012 | Parker | |
| 2012/0303865 A1 | 11/2012 | Hars | |
| 2012/0317433 A1 | 12/2012 | Ellis et al. | |
| 2012/0324481 A1 | 12/2012 | Xia et al. | |
| 2013/0031298 A1 | 1/2013 | Tan et al. | |
| 2013/0046921 A1 | 2/2013 | Pyeon | |
| 2013/0067138 A1* | 3/2013 | Schuette | G06F 3/0616 711/103 |
| 2013/0132638 A1* | 5/2013 | Horn | G06F 12/0871 711/103 |
| 2013/0254458 A1* | 9/2013 | Pittelko | G06F 12/02 711/103 |
| 2013/0270643 A1 | 10/2013 | Lee et al. | |
| 2013/0305247 A1 | 11/2013 | Easton et al. | |
| 2013/0311751 A1 | 11/2013 | Kurihara et al. | |
| 2013/0326113 A1* | 12/2013 | Wakrat | G06F 12/0868 711/103 |
| 2013/0326116 A1* | 12/2013 | Goss | G06F 12/0871 711/103 |
| 2014/0019675 A1* | 1/2014 | Oh | G06F 12/0246 711/103 |
| 2014/0129758 A1 | 5/2014 | Okada | |
| 2014/0156921 A1* | 6/2014 | Schuette | G06F 3/0616 711/103 |
| 2014/0208046 A1 | 7/2014 | Baryudin et al. | |
| 2014/0229605 A1 | 8/2014 | Besser | |
| 2014/0331010 A1 | 11/2014 | Rankin et al. | |
| 2015/0026415 A1 | 1/2015 | Clausen et al. | |
| 2015/0039810 A1* | 2/2015 | Chou | G06F 12/0246 711/103 |
| 2015/0178188 A1 | 6/2015 | Grin et al. | |
| 2015/0293701 A1 | 10/2015 | Kim et al. | |
| 2015/0301763 A1* | 10/2015 | Shaharabany | G06F 3/0613 711/115 |
| 2016/0099061 A1 | 4/2016 | Ziperovich | |
| 2017/0139626 A1* | 5/2017 | Wakchaure | G06F 3/0625 |
| 2017/0177258 A1* | 6/2017 | Bates | G06F 3/0629 |
| 2017/0249092 A1* | 8/2017 | Konosu | G06F 3/0619 |
| 2017/0277473 A1* | 9/2017 | Shin | G06F 3/0619 |
| 2017/0371794 A1* | 12/2017 | Kan | G06F 12/0871 |

OTHER PUBLICATIONS

Jang et al., "Vertical Cell Array using TCAT(Terabit Cell Array Transistor) Technology for Ultra High Density NAND Flash

(56) References Cited

OTHER PUBLICATIONS

Memory," *2009 Symposium on VLSI Technology Digest of Technical Papers*, pp. 192-193, 2009.
Nowak, E. et al., "Intrinsic Fluctuations in Vertical NAND Flash Memories", *2012 Symposium on VLSI Technology Digest of Technical Papers*, 2012, pp. 21-22.
"Write Amplification", http://en.wikipedia.org/wiki/Write_amplification, 13 pages, printed Mar. 9, 2013.
Application as Filed for U.S. Appl. No. 13/800,256 entitled, "Mobile Computing Device and Method for Dynamic Application Hibernation Implemented with Non-Linux Operating System", filed Mar. 13, 2013, 41 pages.
Application as Filed for U.S. Appl. No. 13/800,330 entitled, "Mobile Computing Device and Method for Dynamic Application Hibernation Implemented with Function Calls Sent From an Application Management Layer Running in a User Space to an Operating System Kernel", filed Mar. 13, 2013, 41 pages.
Application as Filed for U.S. Appl. No. 13/829,010 entitled, "Storage Module and Method for Regulating Garbage Collection Operations based on Write Activity of a Host", filed Mar. 14, 2013, 23 pages.
Application as Filed for U.S. Appl. No. 14/219,868 entitled, "Computing Device and Method for Predicting Low Memory Conditions", filed Mar. 19, 2014, 33 pages.
Application as Filed for U.S. Appl. No. 14/133,979, filed Dec. 19, 2013, 121 pages.
Application as Filed for U.S. Appl. No. 14/136,103, filed Dec. 20, 2013, 56 pages.
Application as Filed for U.S. Appl. No. 14/254,393 entitled, "Storage Module and Method for Adaptive Burst Mode", filed Apr. 16, 2014, 31 pages.
Office Action for U.S. Appl. No. 14/254,393 dated Jun. 16, 2014, 18 pages.
International Search Report and Written Opinion for PCT/US2015/024843 dated Jul. 27, 2015, 9 pages.
Office Action for U.S. Appl. No. 14/272,251 dated Sep. 18, 2015, 31 pages.
Office Action for U.S. Appl. No. 14/272,244 dated Dec. 31, 2015, 52 pages.
Office Action for U.S. Appl. No. 14/272,257 dated Jan. 8, 2016, 7 pages.
Office Action for U.S. Appl. No. 14/272,255, dated Apr. 5, 2016, 12 pages.
Office Action for U.S. Appl. No. 14/272,251, dated May 5, 2016, 35 pages.
Office Action in U.S. Appl. No. 14/272,257 dated Jul. 21, 2016, 8 pages.
Office Action in U.S. Appl. No. 14/272,244 dated Aug. 12, 2016, 69 pages.
Office Action in U.S. Appl. No. 14/272,251 dated Nov. 17, 2016, 26 pages.
Office Action in U.S. Appl. No. 14/272,255 dated Nov. 2, 2016, 16 pages.
"IBM Knowledge Center-How Paging Works in z/OS", printed from the internet: www.ibm.com/support/knowledgecenter/zosbasics/com.ibm.zos.zconcepts/zconcepts_91.htm , Nov. 21, 2016, 2 pages.
Kay, T., "Linux Swap Space", *Linux Journal*, Feb. 28, 2011, 5 pages.
Office Action in U.S. Appl. No. 14/272,244, dated Dec. 5, 2016, 44 pages.
Notice of Allowance in U.S. Appl. No. 14/272,255, dated Mar. 6, 2017, 12 pages.
Notice of Allowance in U.S. Appl. No. 14/272,244, dated Mar. 30, 2017, 18 pages.
Notice of Allowance in U.S. Appl. No. 14/272,257, dated May 18, 2017, 9 pages.
Office Action in U.S. Appl. No. 14/272,251, dated Jun. 1, 2017, 32 pages.

* cited by examiner

METHOD AND SYSTEM FOR IMPROVING SWAP PERFORMANCE

BACKGROUND

One of the limitations of mobile computing devices (e.g., smartphones and tablets) today is the amount of volatile memory (e.g., DRAM) available on the computing device. Volatile memory is used both to run applications on the computing device and to temporarily store data to be written in non-volatile memory. The limited volatile memory capacity sometimes creates competition for its volatile memory space. For example, it is often desired to keep an application in volatile memory even though a user is not currently using the application, as this avoids the time needed to re-launch the application from scratch whenever the user returns to the application. However, there is a limit on the number of applications that can be stored in volatile memory. If the number of stored applications results in a shortage of volatile memory, a "swap out" process can be used to create free space in the volatile memory by moving some of the applications from volatile memory to non-volatile memory. However, if free space in volatile memory needs to be created very quickly to cache an unusually large amount of incoming data (e.g., when a user is using his smartphone to shoot a long video), the process of swapping out the applications may take too long, and the applications may need to be terminated in order to quickly create free space.

To avoid terminating applications (and to avoid the delay in re-launching them) when data is being transmitted faster than normal ("burst mode"), some computing devices write data directly into non-volatile memory at a high rate for a limited amount of time, with minimal use of the volatile memory as a cache. Unfortunately, several penalties may be incurred when returning to normal mode, such as needing to move the written data in the non-volatile memory from single-level cells (SLC) to multi-level cells (MLC) and needing to perform garbage collections operations that were suspended during burst mode. These penalties can put additional stress on memory resources.

Overview

Embodiments of the present invention are defined by the claims, and nothing in this section should be taken as a limitation on those claims.

By way of introduction, the below embodiments relate to a method and system for improving swap performance. In one embodiment, a computing device is provided with a volatile memory and a non-volatile memory, wherein the non-volatile memory has a first swap area with multi-level cell (MLC) memory and a second swap area with single-level cell (SLC) memory. One of the characteristics of SLC memory is that data is written more quickly in the SLC memory than the MLC memory. A determination is made whether the computing device is operating in normal mode or burst mode. If it is determined that the computing device is operating in normal mode, data is moved from the volatile memory to the first swap area during a swap operation. If it is determined that the computing device is operating in burst mode, data is moved from the volatile memory to the second swap area during a swap operation.

Other embodiments are possible, and each of the embodiments can be used alone or together in combination. Accordingly, various embodiments will now be described with reference to the attached drawings.

DETAILED DESCRIPTION OF EXEMPLARY EMBODIMENTS

The following embodiments provide a method and system for improving swap performance. As mentioned above, a "swap out" process can be used to create free space in the volatile memory by moving some of the applications from volatile memory to non-volatile memory. However, if free space in volatile memory needs to be created very quickly to cache an unusually large amount of incoming data (e.g., when a user is using his smartphone to shoot a long video), the process of swapping out the applications may take too long, and the applications may need to be terminated in order to quickly create free space. To avoid terminating applications (and to avoid the delay in re-launching them), a computing device can deal with a "burst mode" by writing data directly into non-volatile memory at a high rate for a limited amount of time. However, several penalties may be incurred when returning to normal mode, and these penalties can put additional stress on the memory resources. The following embodiments can be used to improve swap performance so that these penalties can be reduced or avoided when returning to normal mode.

Before turning to these and other embodiments, the following paragraphs provide a discussion of exemplary computing and storage devices that can be used with these embodiments. Of course, these are just examples, and other suitable types of computing and storage devices can be used.

Figure 1:
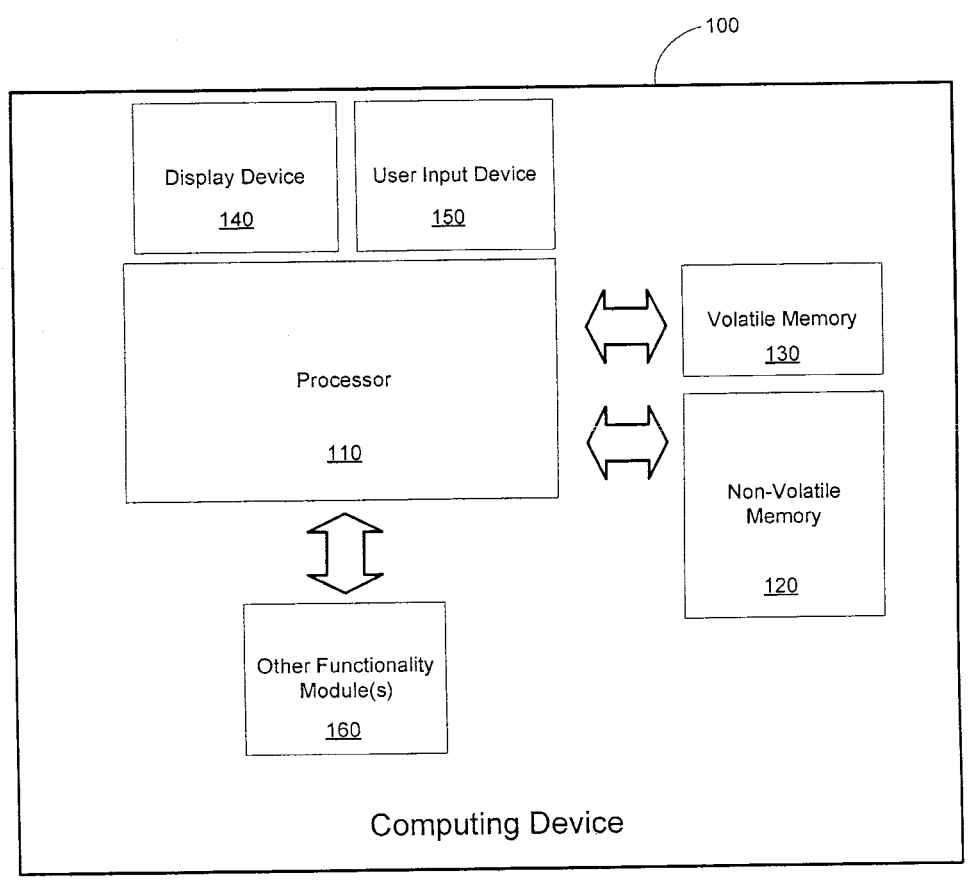
FIG. 1 is a block diagram of an exemplary computing device of an embodiment.

Turning now to the drawings, FIG. 1 is a block diagram of a computing device 100 of an embodiment. As shown in FIG. 1, the computing device 100 comprises a processor 110, non-volatile memory 120, volatile memory 130 (e.g., RAM), a display device 140, a user input device 150, and one or more optional other functionality module(s) 160. The computing device 100 can take any suitable form, such as, but not limited to, a mobile phone, a tablet computer, a digital media player, a game device, a personal digital assistant (PDA), a mobile (e.g., notebook, laptop) personal computer (PC), a book reader, or any combination thereof.

The computer device 100 can be a mobile or non-mobile (e.g., desktop, set-top) device. The user input device 150 can also take any suitable form and can be separate from or integrated with the display device 140. For example, the user input device 150 can be a physical keyboard or can be a touch-sensitive surface on the display device 140. The optional other functionality module(s) 160 can also take any suitable form, depending on the nature of the computing device 100. For example, if the computing device 100 is a mobile phone, the other functionality module(s) 160 can include hardware and/or software components to make and place telephone calls. As another example, if the computing device 100 has network connectivity capabilities, the other functionality module(s) 160 can include a network interface. Of course, these are just some examples, and other implementations can be used. Also, the computing device 100 can include other components (e.g., an audio output, input-output ports, etc.) that are not shown in FIG. 1 to simplify the drawings.

The processor 110 is responsible for running the general operation of the computing device 100. This includes, for example, running an operating system, as well as various applications. The computer-readable program code for the operating system and applications can be stored in the non-volatile memory 120 and then loaded into the volatile memory 130 for execution.

The non-volatile and volatile memories 120, 130 can take any suitable form. For example, the volatile memory 130 can use any current or future technology for implementing random access memory (RAM) (or dynamic random access memory (DRAM)). In one embodiment, the non-volatile memory 120 takes the form of a solid-state (e.g., flash) memory and can be one-time programmable, few-time programmable, or many-time programmable. The non-volatile memory 120 can be two-dimensional or three-dimensional and can use single-level cell (SLC), multiple-level cell (MLC), or other memory technologies, now known or later developed.

Figure 2A:
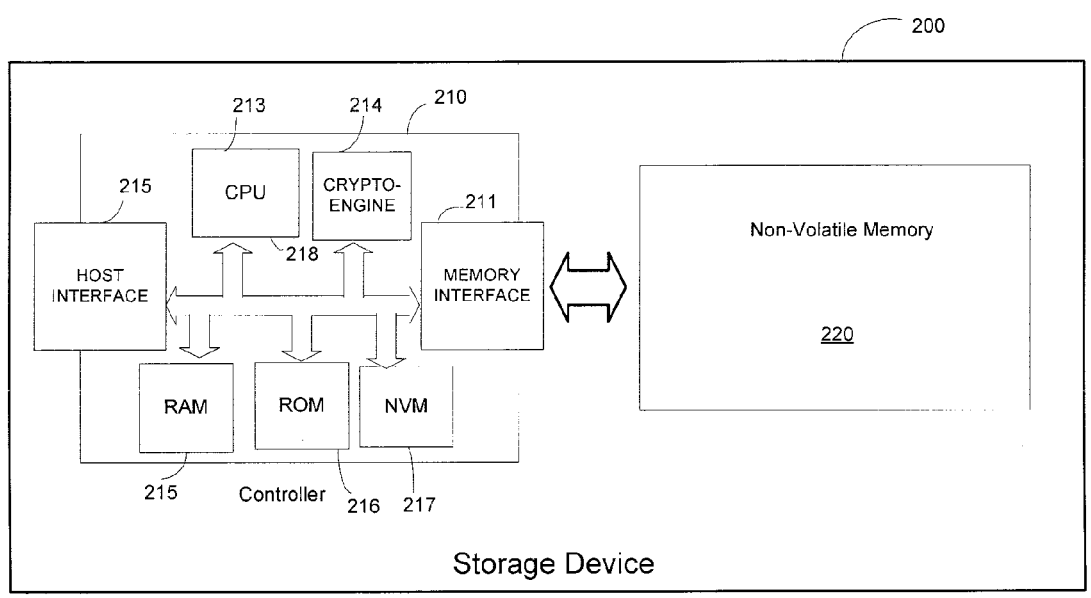
FIG. 2A is a block diagram of an exemplary storage device of an embodiment.

The non-volatile memory 120 can simply be a memory chip or can be part of a self-contained storage device with its own controller. An example of such a storage device 200 is shown in FIG. 2A. As illustrated in FIG. 2A, the storage device 200 comprises a storage controller 210 and non-volatile memory 220. The storage controller 210 comprises a memory interface 211 for interfacing with the non-volatile memory 220 and a host interface 212 for placing the storage device 200 in communication with other components of the computing device 100. As used herein, the phrase "in communication with" could mean directly in communication with or indirectly in communication with through one or more components, which may or may not be shown or described herein. For example, the computing device 100 and storage device 200 can each have mating physical connectors that allow the storage device 100 to be removably connected to the computing device 100.

The storage controller 210 also comprises a central processing unit (CPU) 213, an optional hardware crypto-engine 214 operative to provide encryption and/or decryption operations, read access memory (RAM) 215, read only memory (ROM) 216 which can store firmware for the basic operations of the storage device 200, and a non-volatile memory (NVM) 217 which can store a device-specific key used for encryption/decryption operations, when used. The storage controller 210 can be implemented in any suitable manner. For example, the storage controller 210 can take the form of a microprocessor or processor and a computer-readable medium that stores computer-readable program code (e.g., software or firmware) executable by the (micro) processor, logic gates, switches, an application specific integrated circuit (ASIC), a programmable logic controller, and an embedded microcontroller, for example.

Figure 2B:
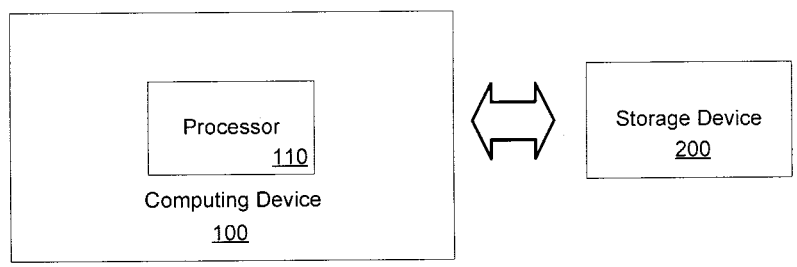
FIG. 2B is a block diagram of a storage device that is removably connectable to a computing device of an embodiment.

The storage device 200 can be embedded in or removably connected with the computing device 100. FIG. 2B shows an embodiment, in which the storage device 200 is removably connected with the computing device 100. The storage device can take any suitable form, including, but not limited to, an iNAND™ eSD/eMMC embedded flash drive by SanDisk Corporation (or embedded drives by other manufacturers), a Secure Digital (SD) memory card, a microSD memory card, a Compact Flash (CF) memory card, or a universal serial bus (USB) device. Of course, these are only examples.

Returning to FIG. 1, the non-volatile memory 120 can store computer-readable program code that is executed by the processor 110 to provide various functions of the computing device 100. For example, the non-volatile memory 120 can store computer-readable program code for one or more applications ("apps"), as well as code for an operating system kernel. When the processor 110 executes these sets of code, the processor 100 runs the software to enable their functionality.

Figure 3:
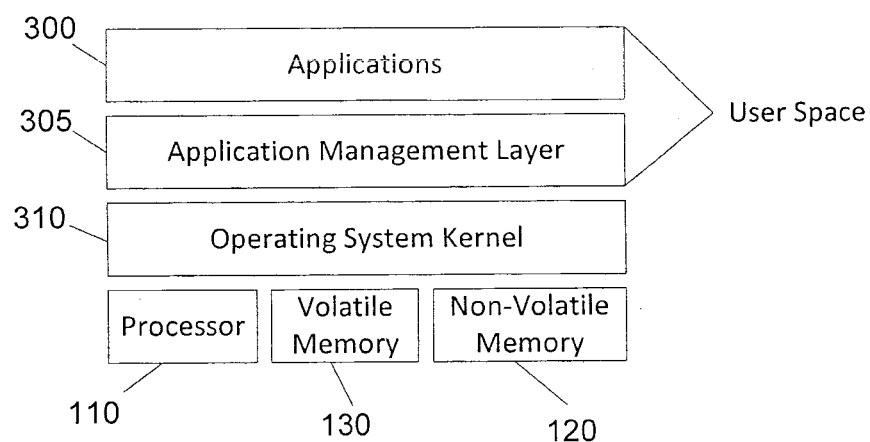
FIG. 3 is an illustration of the functional relationship between applications, an application management layer, and an operating system kernel of an embodiment.

As shown in FIG. 3, a typical model for the operation of the software in the computing device 100 partitions the "space" of the software into two main components: the user space (which contains applications 300 and an application management layer 305 (or "application manager")) and the operating system space (which contains the operating system kernel 310). In general, the operating system kernel 310 is the component of the operating system that serves as a bridge between the applications 300 and the application management layer 305 (both of which are running in the user space) and the processor 110 and non-volatile and volatile memories 120, 130 by managing the communication between these software and hardware components. The application management layer 305 is responsible for determining which of the applications 300 should reside in volatile memory 130, and the operating system kernel 310 is responsible for deciding which of the applications 300 should be allocated to the processor 110. The application management layer 305 requests a service from the operating system kernel 310 by issuing function calls, such as, for example, close, open, read, wait, and write calls.

In the user space, the relevant objects are applications (e.g., such as apps for making a phone call, taking a picture, opening a video, etc.), and each application translates into a process (or several processes) that needs to run in order to support the application's functionality. Each process has a projection into the kernel space. From the operating system kernel's perspective, a process is an entity that requires resources: memory, time slots to run in, structures that describe the process, etc. The operating system kernel 310 is the process manager and allocates the memory resources and the time slots where the process can run. So, in some sense, the processes can be said to run in the operating system kernel 310; however, the operating system kernel 310 has no knowledge of the functionality of the processes. The operating system kernel 310 does not even know if a process is running in the background or foreground. From the operating system kernel's perspective, the process is defined by the resources it needs to support it.

In the user space, the application management layer 305 is aware of the functionality of each process, of the processes associated with each application 300, and of the priority of an application 300 and its associated processes. In order to support the operating system kernel 310 in its role of resource allocation to the processes running in the operating system kernel 310, the application management layer 305 in the user space can compute a priority parameter, sometimes known as adjustment, and reports this parameter to the operating system kernel 310. Typically, the adjustment parameter is added to the structure defining the process (i.e., the reflection of the process in the kernel space) and will be updated on a regular basis. For example, the adjustment parameter can be defined as a 16-level parameter where a low value indicates high priority and a high value indicates low priority. Whenever memory resources are insufficient for fulfilling a memory allocation request of a process (in the operating system kernel 310), the operating system kernel 310 may free some memory in the volatile memory 130, either by swapping (i.e., moving some data from the volatile memory 130 (e.g., RAM) into the non-volatile memory (e.g., main storage)) or by ending (or "killing") low-priority processes (as indicated by the adjustment parameter). The operating system kernel 310 can compute a first threshold function: A=F (free memory, required memory), where A is a number in the range of the adjustment parameter. Then, the operating system kernel 310 can kill any process with an adjustment greater than (or equal) to A in order to fulfill the requests from current processes.

The following embodiments can be implemented in any suitable manner in the computing device 100. For example, as discussed above, the processor 110 of the computing device 100 can execute an operating system kernel 310 as well as applications 300 and an application management layer 310 running in the user space. The operating system kernel 310 can be Linux or incompatible with Linux. Operating systems with a kernel incompatible with Linux include, but are not limited to, Windows operating systems (e.g., Windows 8 NT and Windows 8) and Apple operating systems (e.g., iOS and Mac-OSx). Also, the various acts discussed below can be performed by sending function calls from the application management layer 305 to the operating system kernel 310.

Further, in some embodiments, a storage device (e.g., eMMC or UFS devices) can be designed with a special partition of the same chip, or a special chip, that is designed for high performance and endurance. This may assist in the adoption of swap operations in mobile computing devices. That is, many current mobile operating systems do not enable swap due to the concern of the endurance of embedded storage devices. Specifically, the concern is that if swap is utilized as a DRAM extension, it will result in increased traffic and cause severe stress to the embedded device, possibly damaging the device and rendering the whole system non-operable. Also, traditionally, eMMC devices all have limited endurance and are not designed for swapping. Using a partition or special chip designed for high performance and endurance can help address this issue. The following paragraphs provide more information on the swapping process.

To launch an application, the processor 110 in the computing device 100 loads computer-readable program code for the application from the non-volatile memory 120 into the volatile memory 130 and then executes the code. Executing the code can create dynamic application data, which is also stored in the volatile memory 130. As used herein, "dynamic application data" (or "application data") refers to data that is dynamically allocated by the application for internal use and maintains the state information of the application, such that, if lost, will require the application to be reloaded. Examples of such application data include, but are not limited to, temporary data that is buffered, data allocated in an internal stack or cache, or video/graphic data that is buffered for rendering purposes, data from specific or shared libraries, and data generated from external data (e.g., from a network).

Figure 4C:
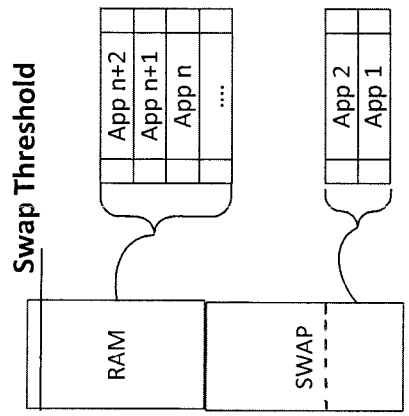
FIGS. 4A-4C are diagrams that illustrate a swapping mechanism of an embodiment.
Figure 4B:
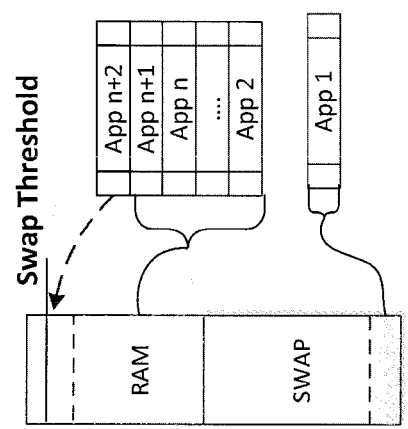
Figure 4A:
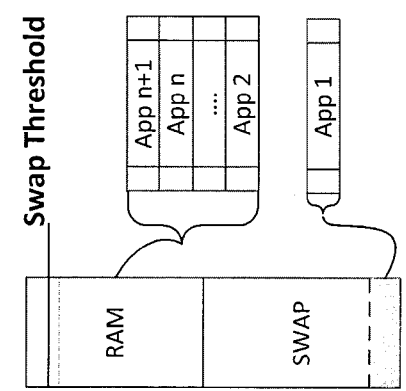

Because a computing device typically has a relatively-small amount of volatile memory as compared to non-volatile memory, there is a limit as to the number of applications that can be loaded into volatile memory. That is, while computing devices are generally fitted with sufficient volatile memory (e.g., DRAM) for handling the memory requirements during the initial system boot process, additional memory may be needed when applications are loaded on an as-needed basis by the operating system or explicitly by the user. As such, as some point, the computing device 100 may need to end (or "kill") one or more applications currently running in the volatile memory 130 in order to provide volatile memory resources for a new application. However, to re-start a killed application, the launching process is repeated, and this may cause an undesirable delay for the user. To reduce this delay, instead of killing the application, the processor 110 can use the non-volatile memory 120 as a memory extension to the storage space in the volatile memory 130, and move (or "swap out") the application data from the volatile memory 130 to the non-volatile memory 120. (As the code for the application itself is already stored in the non-volatile memory 120, the code residing in the volatile memory 130 can simply be deleted instead of moved to the non-volatile memory 120). In this way, when the user wants to re-launch the application, after the application code is executed, the processor 110 simply needs to move the "swapped-out" application data the non-volatile memory 120 to the volatile memory 130, instead of generating the application data again from scratch, as the swapped-out application data contains all the state information needed for the application to continue. This reduces the delay the user experiences when re-launching the application. FIGS. 4A-4C illustrate this swap process in more detail.

In FIGS. 4A-4C, the volatile memory 130 is diagrammatically shown as RAM, and the non-volatile memory 130 is diagrammatically shown as SWAP memory. As noted above, the SWAP memory can be a partition in the non-volatile memory 120 or can be a separate memory device. These figures show a "swap threshold," which is the minimum amount of available space that the volatile memory 130 is desired to have for caching and other operations. The operating system of the computing device 100 maintains a dynamic pool of available memory for use by the kernel and a separate pool for application usage. A swapping operation occurs when the available space in the volatile memory 130 has dropped below the threshold level.

In FIG. 4A, the volatile memory (RAM) stores the application code and application data for Apps 2 through n+1. App 1 has already been swapped out, so the application data for App 1 is stored in the non-volatile memory (SWAP) 120. During a normal operating mode, the computing device 100 will be in a steady state, where the RAM utilization will be below a predetermined threshold level (e.g., for system caching). As long as the computing device 100 does not exceed this threshold, the computing device will maintain its steady state. If there is any action that causes the RAM usage to exceed the threshold, such as a App n+2 launch (see FIG. 4B), the RAM usage will trigger a swap action. As shown in FIG. 4C, when this occurs, the processor 110 moves the application data for App 2 from the RAM to the SWAP memory (and deletes the application code for App 2 from the RAM) to create room in the RAM for App n+2. Thus, the App n+2 launch causes the computing device 100 to rebalance the available memory by effecting a swap action from the RAM to the SWAP area, thereby freeing-up RAM for future use.

It should be noted that, in some implementations, units of swap and volatile memory are pages, and the swap operation is not aware of applications. So, in those implementations, the operating system can remove parts of applications instead of the whole application. It should also be noted that the processor 110 can use any suitable technique for determining which application (or part(s) of the application) to swap out. For example, in the memory swapping mechanism that can be used with Linux systems in Android phones, specific portions of application data in the volatile memory are moved to the non-volatile memory using a least-recently-used (LRU) mechanism to determine which pieces (e.g., in increments of 4 KB) can be moved to the non-volatile memory. This method provides a scheme for moving out old, cold data that has not and will likely not be accessed for some time.

As discussed above, if free space in volatile memory needs to be created very quickly to cache an unusually large amount of incoming data (e.g., when a user is using his smartphone to shoot a long video), the process of swapping out the applications may take too long, and the applications may need to be terminated in order to quickly create free space. To avoid terminating applications (and to avoid the delay in re-launching them) when data is being transmitted faster than normal ("burst mode"), some computing devices write data directly into non-volatile memory at a high rate for a limited amount of time, with minimal use of the volatile memory as a cache. As used herein, a "burst mode" refers to a relatively-high load period by the host (i.e., a period in which the host is writing a relatively-high amount of data and/or issues a relatively-high number of write commands). That is, bursts are periods of time when a higher than average performance by the storage module is required to satisfy the write activity of the host.

For example, in some storage modules, the burst mode may be capable of supporting a storage rate of 160 MB/s for 4 GB (e.g., to match the average rate that the video data is produced), while the normal mode may support rates of up to 80 MB/s for 12 GB. To achieve this higher-than-average performance, the storage module can store data in a single-level cell (SLC) partition instead of a multi-level cell (MLC) partition, as writing to SLC cells is faster than writing to MLC cells. Alternatively, instead of writing to a dedicated SLC partition, if the memory supports a dynamic configuration where a memory cell can be used either as an SLC cell or an MLC cell on demand, certain memory cells can be configured to be SLC cells during a burst mode. SLC mode is faster than MLC mode but consumes memory resources (i.e., the memory cells) at a rate that is at least twice the rate of MLC storage. Therefore, the capacity of a memory working in burst mode is smaller than the capacity of the memory working in non-burst mode, where MLC cells would be used.

Moreover, in order to maximize the storage rate of a burst, the memory management software/firmware can be configured to avoid garbage collection operations during burst mode, as the number of memory cells available to store data is temporarily reduced during the garbage collection process. Garbage collection is a memory management process in which the storage controller uses its idle time to consolidate blocks of memory before a need to write new data. In burst mode, garbage collection can be avoided in order to maximize the storage rate of a burst. However, while maximizing instantaneous performance, avoiding garbage collection also reduces capacity, since at some point, the memory may exhaust all the existing free blocks and may have no additional available space for storing additional information.

Accordingly, there are several penalties that may be incurred when returning to normal mode, and these penalties can put additional stress on the memory resources. The following embodiments can be used to improve swap performance so a swapping operation can be used instead how burst mode is traditionally dealt with. This provides efficient relaxation of system stress, while paying a smaller penalty when returning to normal mode.

Figure 5:
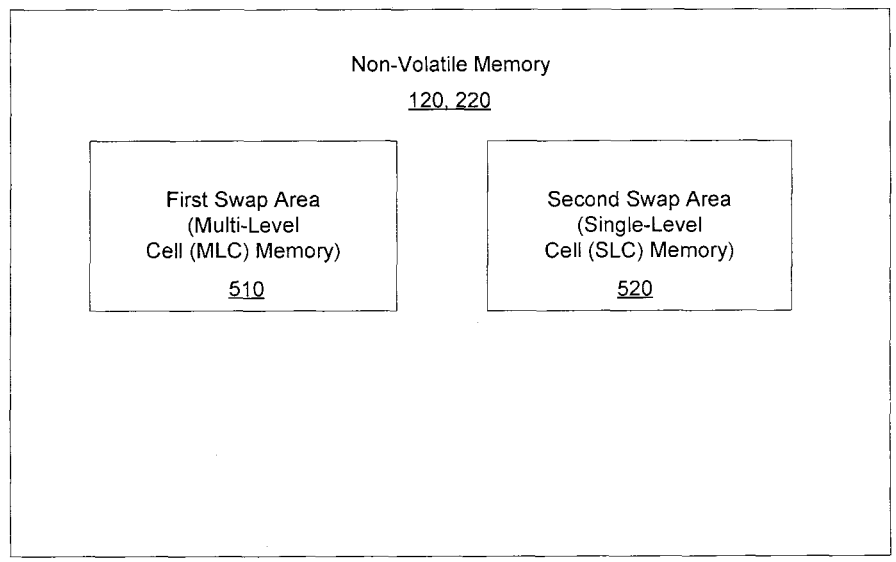
FIG. 5 is a block diagram of non-volatile memory of an embodiment.

In one embodiment, instead of bypassing the volatile memory 130 in a burst mode, the computing device 100 tries to quickly create free space in the volatile memory 130 without killing applications. To do this, the non-volatile memory 120, 220 in this embodiment has a first swap area 510 with multi-level cell (MLC) memory and a second swap area 520 with single-level cell (SLC) memory 530 (see FIG. 5). Data is written more quickly in the SLC memory than the MLC memory, so data can be swapped out of the volatile memory 130 more quickly if the second swap area 530 is used. After the burst mode has ended, the data written to the second swap area 530 can be move to the first swap area 520. Because it is only the swapped data that needs to be move from SLC memory to MLC memory, a smaller performance penalty is paid as compared to the above approach of writing all the incoming burst data to SLC and then having to later move all that data to MLC.

The first and second swap areas 510, 520 can be configured in any suitable way. For example, in one embodiment, the first and second swap areas 510, 520 are different memory partitions, and the second swap area 520 is used when the computing device's processor 110 identifies that the system is in stress and that there is no time to apply a memory swap to the first swap area 510 without negatively impacting performance. In this way, when the system is stressed, swap data can be routed to the dedicated SLC partition 520, while during normal operation, swap data can be routed to the regular MLC partition 510. This approach is transparent to the storage device since, from the storage device's perspective, it knows nothing about the data type that the host is writing. The fast partition can be used for other processes and usages.

When the system exits from the stress condition, the data in the SLC swap partition 520 can be copied to the normal MLC swap partition 510. Such copying can be done in any suitable way. For example, the computing device 100 can initiate and control the copying ("copy via host control"). With this option, the copying process can be carried out in a synchronous fashion (i.e., the host can issue a write command for each clock cycle). As another example, the storage controller 210 can control the copying in response to a copy command from the computing device 100 ("copy via storage device control"). According to this option, the computing device 100 can send a "copy" command to the storage device controller 210 and the "forget" about it, as from there, the storage device controller 210 is in charge. The copy process can involve sensing the flash, ECC decoding and reconstruction, and writing into the MLC partition 510 and can be a lengthy process but is less complex than writing via host control. In yet another example, the copying can be performed as an on-chip copy process on the memory die ("on-chip copy"). This is the least-complex method where data is copied directly from the SLC partition 520 to the MLC partition 510 without any transferring of data outside of the flash array die. However, this method requires that the source and target memory addresses are in the same die.

Figure 6:
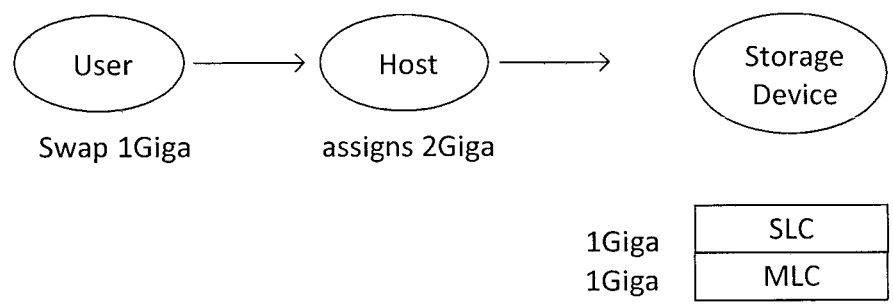
FIG. 6 is an illustration of a swap partition of an embodiment with single-level cell and multi-level cell areas having different logical block addresses.

Instead of being two separate partitions, the MLC and SLC swap areas 510, 520 can be two different areas of the same partition. This embodiment is illustrated in FIG. 6. Here, if a user wishes to set up a 1 GB swap area, the host can assign 2 GB in the storage device (one for the SLC area and one for the MLC area) in a way that is transparent to the user. Logically, there will only be one partition, but, physically, there will be two (or more) different areas, each with a different logical block address range. In this example, the lower 1 GB addresses are associated with enhanced (SLC) mode, and the upper 1 GB addresses are associated with normal (MLC) mode. Thus, swapping out data up to 1 GB can be met, with the price of setting aside both 1 GB of MLC memory (which can be used when operating in normal mode) and 1 GB of SLC memory (which can be used when operating in enhanced mode). Using only one partition is easy to configure (the user will see one partition) and is easy to handle in kernel. Also, there is no need to maintain priority, which can be a challenge in operating system environments that does not support multiple swap partitions with dynamic priority (e.g., Linux).

In operation, when the computing device's processor 110 determines that the computing device 100 is operating in burst mode, it will issue commands to swap data from the volatile memory 130 to the SLC area (e.g., by writing to the LBA range of the SLC area). To resume normal swap operations at the end of the burst mode, the processor 100 would use the LBA range of the MLC area. Accordingly, in this embodiment, the host routes data to an LBA range associated with its current mode (burst or normal).

Figure 7:
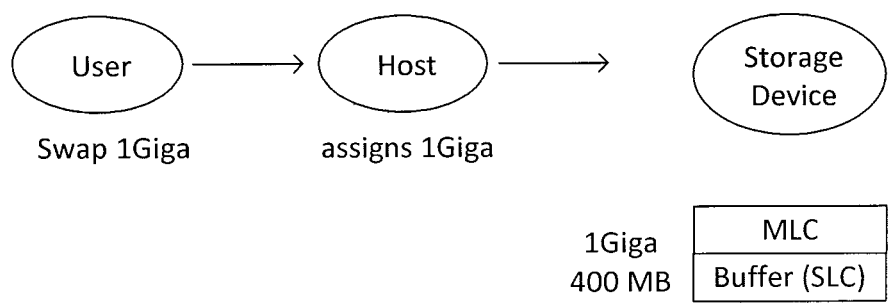
FIG. 7 is an illustration of an embodiment having a multi-level cell area with a logical block address and a single-level cell buffer.

In another embodiment, there is only one swap area and one LBA range which can be dynamically adapted to operate in burst mode when the system is stressed and in normal mode otherwise. With reference to FIG. 7, in this embodiment, the host creates a swap area of MLC cells of the same size as requested by the user (in this example, 1 GB). Accordingly, only the MLC swap area has a logical block address range that is addressable by the computing device's processor 110. The storage module does have, however, an SLC buffer that can be used to more quickly perform a swap operation when the host is in burst mode. In this example, the SLC buffer is of a smaller size than the MLC swap area (400 MB compared to 1 GB), although, in other embodiments, the SLC buffer is the same size as the MLC swap area, or even of greater size).

Because the host assigns one address range matching the user definitions of the swap space in this embodiment, addresses sent to the storage device are from only one address range. Thus, the storage device decides whether to use SLC or MLC memory based on whether the computing device 100 is in burst mode. The storage module can determine that the computing device 100 is in burst mode from an express indication from the computing device's controller 110 (e.g., a message from the host indicating that the host buffer is full, which would be indicative of burst mode) or inferentially, such as from detecting a pattern of write activity that is indicative of burst mode (in which case, the decision as to whether to use the SLC or MLC swap area is made by the storage module and is transparent to the host). Similarly, the end of the burst mode can be determined from an express indication by the computing device 100 or from a detected pattern of write activity.

In order to determine whether the host is operating in a burst mode, the storage device can determine if the write activity of the host over a time period exceeds a threshold. The write activity can be, for example, an amount of data received from the host to be written in the storage device and/or a number of write commands received from the host (e.g., the number of input/output operations per second ("IOPS")). In one particular implementation, the time period is 100-200 msec; however, other time periods can be used. Additionally, the threshold against which to measure write activity can be static (an absolute number) (e.g., data being received from the host at a rate of 40 MB/sec and/or 200-2,000 write commands being received from the host over a 100-200 msec window) or dynamic (a relative number) (e.g., as a percentage based on previous write activity of the host (over the same or different time period) in a weighted or unweighted manner). The end of burst mode can be detected by comparing the write activity (e.g., the amount of data received from the host and/or the number of write commands received from the host over a time period) to a threshold. This threshold can be the same as the threshold used to determine whether the host was entering into the burst mode or can be different (i.e., the thresholds can "hysteresis," where the criteria for entering and exiting the burst mode is different).

In another embodiment, the storage module is configured to implement a "selective burst mode." When working in selective burst mode, only part of the data that is written to the non-volatile memory 120 will be given high priority and will be written using burst mode, while other data will be given normal priority and can be written in normal mode. For example, swapping data from the volatile memory 130 to the non-volatile memory 120 can relax a stressed system. Therefore, swapping operations can be given burst priorities, while other write commands can be given normal priorities. This is in contrast to other systems implementing burst mode, where burst mode is either applied to all data or not applied at all. Optionally, if the swap is comprised of a normal area and an enhanced area as discussed above, it may be desired to give high priority only to swap operations that are directed to the enhanced area, while other swap operations are given normal priorities or even lower priority than normal write operations that are not related to swap. The reason is that when the system is stressed, writing in burst mode to the swap partition may be the main contributor for relaxing the system stress. However, during normal operation of the system where no stress is identified, normal write operations can have higher priority than swap write operations.

Figure 8:
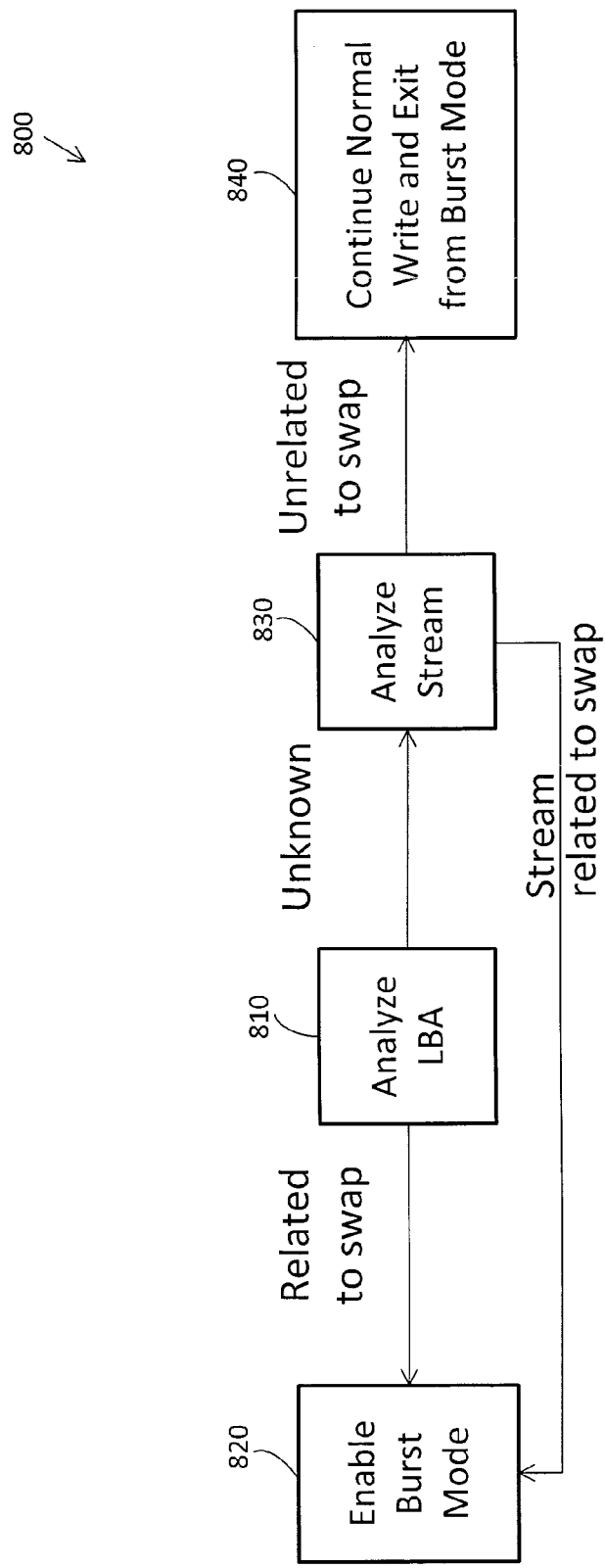
FIG. 8 is a flow chart of an embodiment for selective burst mode.

There are many ways in which the storage module can implement selective burst mode, and FIG. 8 is a flow chart 800 of one such implementation. As shown in FIG. 8, the storage module can analyze an LBA (act 810) received from the host. The storage module can storage LBA ranges associated with certain type of data (e.g., file system data versus user data) and can determine the type of data (and whether or not burst mode should be used) based on the received LBA. So, if the received LBA is related to the swap area, for example, the storage device can enable burst mode (act 820) to quickly clear the volatile memory 130, as discussed above. However, if the received LBA is not in the specified range or is otherwise unknown, the storage module can analyze the stream of data to determine if it related to a swap operation (e.g., if the data is file system data or user data) (act 830). If it is, the storage module can enable burst mode (act 820). However, if the stream is unrelated to a swap operation, the storage module can continue with a normal write operation and exit form burst mode (act 840).

There are several alternatives that can be used. For example, in some cases it may be desirable to assign different write priorities to different write commands on the fly. This may be achieved using a "context ID," where different context IDs are used for swap writes and file system writes (or even among different types of file system writes). Write commands that share a common write priority may be assigned to a common context, while write commands with a different priority may be assigned to a different context. Multiple context IDs may be defined enabling several write priority commands. In this way, the context ID can be used to determine whether or not to use burst mode for that particular write operation.

Figure 9:
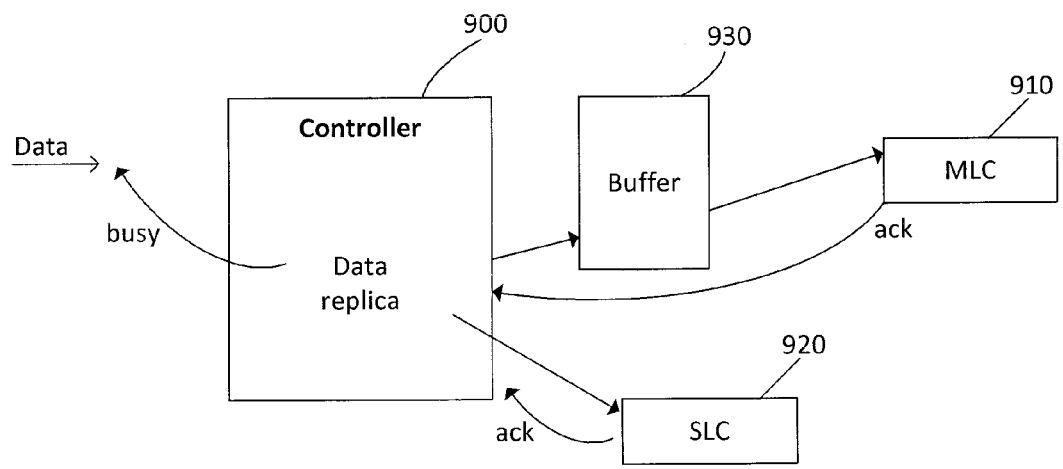
FIG. 9 is an illustration of an embodiment for parallel writes to single-level cell and multi-level cell areas.

In another alternative, instead of writing to either SLC cells or MLC cells (either in a swap operation or a regular burst operation), the storage device can write incoming data to the physical addresses of both the SLC cells and the MLC cells in parallel. This alternative is illustrated in FIG. 9. As shown in FIG. 9, when the storage controller 900 receives data, it stores the data both in the MLC memory 910 and the SLC memory 920 in parallel. Optionally, an additional small buffer 930 can be added between the storage controller 900 and the MLC memory 920 to temporarily store data until it is written to the MLC memory 910, which can allow the storage controller 900 to receive new data from the host.

Data may be considered safely stored whenever the SLC writing has finished, and the host may release the data and move on to the next data if there is a pressing need to do so. Otherwise, the host may keep the data until the MLC writing has been completed. This process may create MLC pages that are only partially written, and the double effort of writing to both SLC and MLC may seem at first sight wasteful in terms of power consumption. However, since data usually needs to be copied from the SLC to the MLC memory at the end of burst mode, such copying does not need to be done in this embodiment for the data that was written in parallel. This avoids the complex and power-consuming copying process of reading data from the SLC memory, transferring it to the storage controller to be decoded, reconstructed, and transferring it back to the MLC memory. In this embodiment, only the parts of the data that were not reliably written to the MLC memory 910 may have to be copied, while the data that is already written to the MLC memory 910 does not.

As another alternative, the cache in the storage device RAM can be used in a flexible manner in order to help relax the stress on the host RAM. The amount of cache in the storage device may be increased or decreased dynamically according to the stress on the host. Also, parts of the cache can be assigned to high priority write commands.

As mentioned above, any type of memory technology can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for performing a swap operation, the method comprising:
   performing in a computing device having a volatile memory and a non-volatile memory, wherein the non-volatile memory has multi-level cell (MLC) memory forming a first swap area and single-level cell (SLC) memory forming a second swap area:
   monitoring a rate at which incoming data is being sent to the volatile memory;
   when the monitored rate is below a first predetermined threshold, swapping first data from the volatile memory to the first swap area of the non-volatile memory; and
   when the monitored rate is above the first predetermined threshold:
   swapping the first data from the volatile memory to the second swap area of the non-volatile memory; and
   when the monitored rate is below the first predetermined threshold, moving the first data from the second swap area of the non-volatile memory to the first swap area of the non-volatile memory.

2. The method of claim 1, wherein the first and second swap areas are different memory partitions, the SLC memory in the second swap area enabling faster data writes relative to the MLC memory in the first swap area.

3. The method of claim 1, wherein the first and second swap areas are different areas in a single memory partition, wherein the first and second swap areas have different logical block address ranges.

4. The method of claim 1, wherein the first swap area has a logical block address range addressable by a processor in the computing device, and wherein the second swap area is a buffer memory.

5. The method of claim 1 further comprising:
   determining whether the computing device is operating in selective burst mode; and
   if it is determined that the computing device is operating in selective burst mode, using the second swap area of the non-volatile memory for the swap operation but using other areas of the non-volatile memory for other write operations.

6. The method of claim 1, wherein a write priority assigned to a command determines whether data associated with that command will be written to the first swap area or the second swap area.

7. The method of claim 1, further comprising moving second data from the volatile memory to both the first and second swap areas of the non-volatile memory during a swap operation.

8. The method of claim 1, wherein the non-volatile memory is part of a storage module having a storage controller, and wherein the storage controller determines whether the monitored rate is below or above the first predetermined threshold.

9. The method of claim 1, further comprising copying the first data from the SLC memory in the second swap area into the MLC memory in the first swap area.

10. The method of claim 9, wherein the computing device initiates and controls the copying.

11. The method of claim 9, wherein the non-volatile memory is part of a storage module, which has a storage controller, and wherein the storage controller controls the copying in response to a copy command from the computing device.

12. The method of claim 9, wherein the non-volatile memory is part of a memory die, and wherein the copying is performed as an on-chip copy process on the memory die.

13. The method of claim 1, wherein the computing device is a mobile device.

14. The method of claim 1, wherein the non-volatile memory is part of a storage module, and wherein the storage module is embedded in the computing device.

15. The method of claim 1, wherein the non-volatile memory is part of a storage module, and wherein the storage module is removably connected to the computing device.

16. The method of claim 1, wherein the non-volatile memory has a three-dimensional configuration.

17. A computing device comprising:
a volatile memory;
a non-volatile memory, wherein the non-volatile memory has multi-level cell (MLC) memory forming a first swap area and single-level cell (SLC) memory forming a second swap area; and
a processor in operative communication with the volatile and non-volatile memories, wherein the processor is configured to:
monitor a rate at which incoming data is being sent to the volatile memory;
when the monitored rate is below a first predetermined threshold, swap first data from the volatile memory to the first swap area of the non-volatile memory; and
when the monitored rate is above the first predetermined threshold,
swap the first data from the volatile memory to the second swap area of the non-volatile memory; and
when the monitored rate is below the first predetermined threshold, moving the first data from the second swap area of the non-volatile memory to the first swap area of the non-volatile memory.

18. The computing device of claim 17, wherein the first and second swap areas are different memory partitions, the SLC memory in the second swap area enabling faster data writes relative to the MLC memory in the first swap area.

19. The computing device of claim 17, wherein the first and second swap areas are different areas in a single memory partition, wherein the first and second swap areas have different logical block address ranges.

20. The computing device of claim 17, wherein the first swap area has a logical block address range addressable by a processor in the computing device, and wherein the second swap area is a buffer memory.

21. The computing device of claim 17, wherein the processor is further configured to:
determine whether the computing device is operating in selective burst mode; and
if it is determined that the computing device is operating in selective burst mode, use the second swap area of the non-volatile memory for the swap operation but using other areas of the non-volatile memory for other write operations.

22. The computing device of claim 17, wherein a write priority assigned to a command determines whether data associated with the command will be written to the first swap area or the second swap area.

23. The computing device of claim 17, wherein the processor is further configured to move second data from the volatile memory to both the first and second swap areas of the non-volatile memory during a swap operation.

24. The computing device of claim 17, wherein the non-volatile memory is part of a storage module having a storage controller, and wherein the storage controller determines whether the monitored rate is below or above the first predetermined threshold.

25. The computing device of claim 17, wherein the processor is further configured to copy the first data from the SLC memory in the second swap area into the MLC memory in the first swap area.

26. The computing device of claim 25, wherein the computing device initiates and controls the copying.

27. The computing device of claim 25, wherein the non-volatile memory is part of a storage module, which has a storage controller, and wherein the storage controller controls the copying in response to a copy command from the computing device.

28. The computing device of claim 25, wherein the non-volatile memory is part of a memory die, and wherein the copying is performed as an on-chip copy process on the memory die.

29. The computing device of claim 17, wherein the computing device is a mobile device.

30. The computing device of claim 17, wherein the non-volatile memory is part of a storage module, and wherein the storage module is embedded in the computing device.

31. The computing device of claim 17, wherein the non-volatile memory is part of a storage module, and wherein the storage module is removably connected to the computing device.

32. The computing device of claim 17, wherein the non-volatile memory has a three-dimensional configuration.

33. A computing device comprising:
a volatile memory;
a non-volatile memory, wherein the non-volatile memory has multi-level cell (MLC) memory forming a first swap area and single-level cell (SLC) memory forming a second swap area;
means for monitoring a rate at which incoming data is being sent to the volatile memory;
means for, when the monitored rate is below a first predetermined threshold, swapping first data from the volatile memory to the first swap area of the non-volatile memory; and
means for, when the monitored rate is above the first predetermined threshold;
swapping the first data from the volatile memory to the second swap area of the non-volatile memory; and
when the monitored rate is below the first predetermined threshold, moving the first data from the second swap area of the non-volatile memory to the first swap area of the non-volatile memory.

* * * * *